United States Patent [19]
Martensson et al.

[11] Patent Number: 5,968,372
[45] Date of Patent: Oct. 19, 1999

[54] LOGIC CONTROLLED TRAVERSING SHOWER

[75] Inventors: Johan Martensson, Markham; Bal K. Sethi, Mississauga; Donald Brown, Orilla, all of Canada

[73] Assignee: Baker Hughes Incorporated, Houston, Tex.

[21] Appl. No.: 08/991,684

[22] Filed: Dec. 16, 1997

Related U.S. Application Data

[60] Provisional application No. 60/033,097, Dec. 16, 1996.

[51] Int. Cl.⁶ .......................... B01D 33/06; B01D 33/46
[52] U.S. Cl. .................. 210/741; 210/744; 210/784; 210/104; 210/107; 210/143; 210/391; 210/402
[58] Field of Search ..................... 210/739, 740, 210/744, 772, 784, 104, 107, 143, 391, 402–404, 409

[56] References Cited

U.S. PATENT DOCUMENTS

| | | | |
|---|---|---|---|
| 3,869,389 | 3/1975 | Rokitansky | 210/784 |
| 4,115,265 | 9/1978 | Otte et al. | 210/402 |
| 4,450,080 | 5/1984 | Dodd | 210/391 |
| 4,695,381 | 9/1987 | Ragnegard | 210/403 |
| 4,697,292 | 10/1987 | La Valley | 210/402 |
| 4,986,881 | 1/1991 | Funk | 210/402 |
| 5,149,448 | 9/1992 | Mattelmaki | 210/784 |
| 5,470,472 | 11/1995 | Baird et al. | 210/391 |
| 5,589,079 | 12/1996 | Park et al. | 210/784 |

*Primary Examiner*—Thomas G. Wyse
*Attorney, Agent, or Firm*—Cantor Colburn LLP

[57] ABSTRACT

A high pressure automatic lime mud precoat filter cake heel removal system provides for steady kiln operation. The system provides multiple points of washing located such that washing of the entire filter can be accomplished in a short period of time. Each washing point comprises preferably two nozzles at predetermined angles to optimize washing of the filter media. The system is reciprocatively driven by a fractional horsepower gear motor connected to a torque converting coupling which is, in turn, connected to a threaded jack shaft or lead screw. The gear motor is controlled by a dual speed reversing variable frequency drive; limit switches automatically control cycling of the system in conjunction with logic circuits and sensors. This system is variably controlled so that cycle times may range optionally from approximately one to approximately five hours in length.

20 Claims, 12 Drawing Sheets

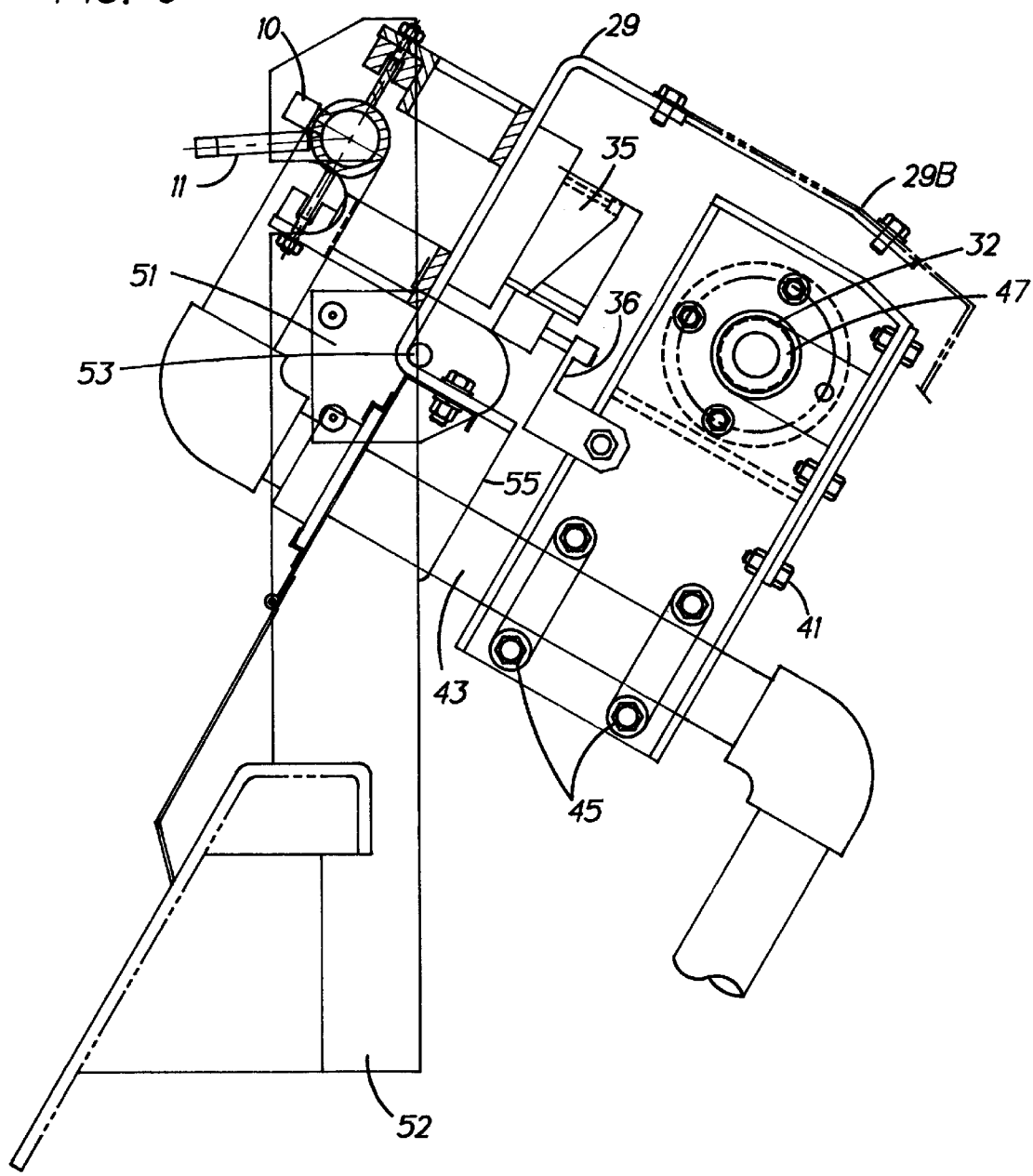

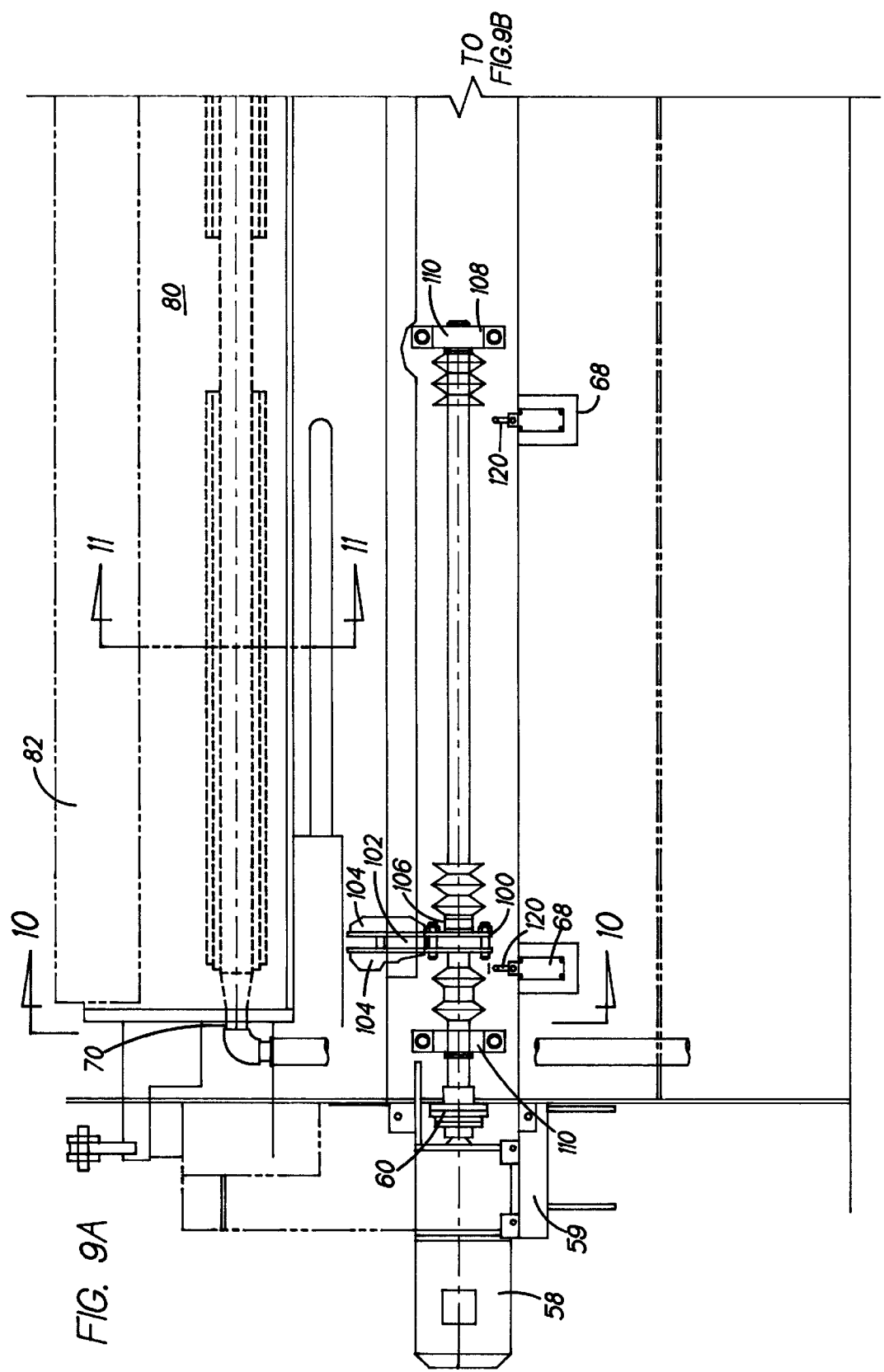

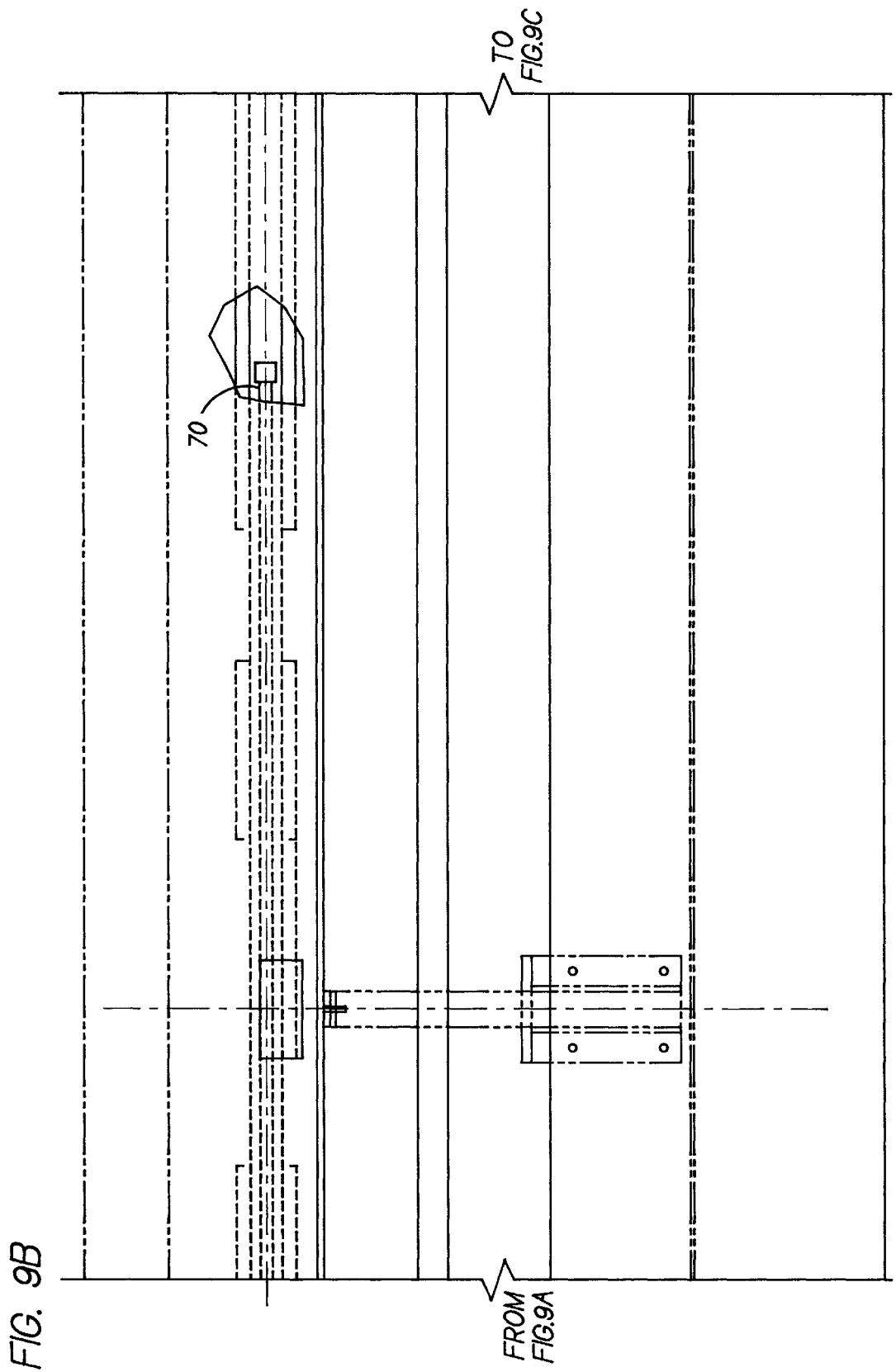

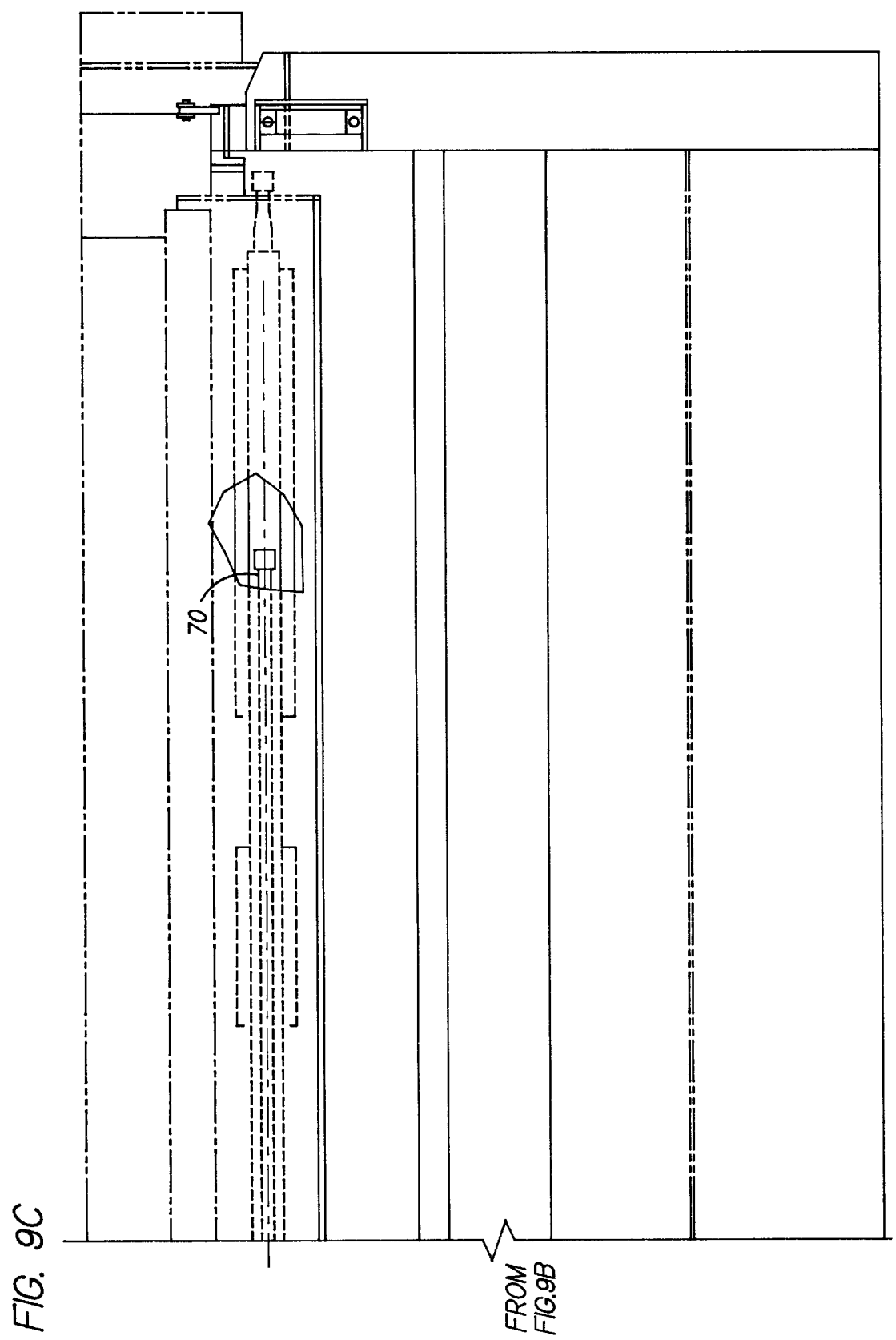

5,968,372

LOGIC CONTROLLED TRAVERSING SHOWER

CROSS REFERENCE TO RELATED APPLICATION

This application claims priority to U.S. Provisional application Ser. No. 60/033,097 filed Dec. 16, 1996.

BACKGROUND OF THE INVENTION

1. Field of the Invention

This invention relates to the field of vacuum filters. More specifically, this invention relates to the field of drum lime mud filters and an apparatus to improve cleaning and efficiency thereof.

2. Prior Art

Lime mud filtering has been known for a substantial number of years and drum type filters have been favored for many years as well. Due to the extensive interest in this field, many modifications and other devices have been invented and employed with lime mud drum filters. One such arrangement has been proposed by Esko Mattelmaki in U.S. Pat. No. 5,149,448. '448 discloses a drum filter for thickening lime sludge in which the lime sludge is thickened on a filter layer having a precoat formed of the lime sludge itself. The device is also provided with high pressure liquid nozzles which continuously reciprocate in the longitudinal direction of the drum. The nozzles are located under the doctor blade on the descending side of the drum. The reference teaches to mount two high pressure nozzles in that location in such a way that one of the nozzles breaks the precoat so that it drops into the vat and that the other nozzle washes the filter cloth clean. While the device does clean the filter it suffers from the drawback of increased wear on the filter medium due to unnecessary overcleaning of the filter element. Moreover, the device of the prior art requires a long cleaning time and, therefore, accelerates motor and drive mechanism wear.

Another prior art device is disclosed in U.S. Pat. No. 5,470,472 to Baird et al. The disclosure teaches a non-traversing cleaning mechanism located on the descending side of the filter drum. Baird et al. teaches that the jets should be angled with respect to the filter media by selecting an angle of from 0 to 45 degrees and more preferably from 0 to 30 degrees measured from a vertical reference.

SUMMARY OF THE INVENTION

The above-discussed and other drawbacks and deficiencies of the prior art are overcome or alleviated by the filter drum cleaning device of the invention.

The device of the invention includes multiple pairs of cleaning nozzles mounted approximately thirty-six to approximately forty-eight inches from one another (it will be understood that the nozzles may be located either above or below the stated range, even to a large extent, as desired) on a moveable support capable of cycling a distance equivalent to the spacing between sets of nozzles. The device includes a motor drive using a fractional horse power motor, a torque converter and a lead screw connecting power to the reciprocating cleaning nozzles. Limit switches, vat liquid sensors and vacuum line ΔP sensors work together to ensure cleaning of the filter media only when required to maintain continuity of the filtering process and to prolong the life of the cloth. The system includes variable speed control and may be located on the descending side or ascending side of the filter drum with appropriate modifications in bracketry.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 8 is an end view of the shower assembly in the tilted position for maintenance;

FIGS. 9A–9C are together an elongated elevation view of the descending side traversing shower arrangement of the invention;

DETAILED DESCRIPTION OF THE PREFERRED EMBODIMENTS

Figure 1A:
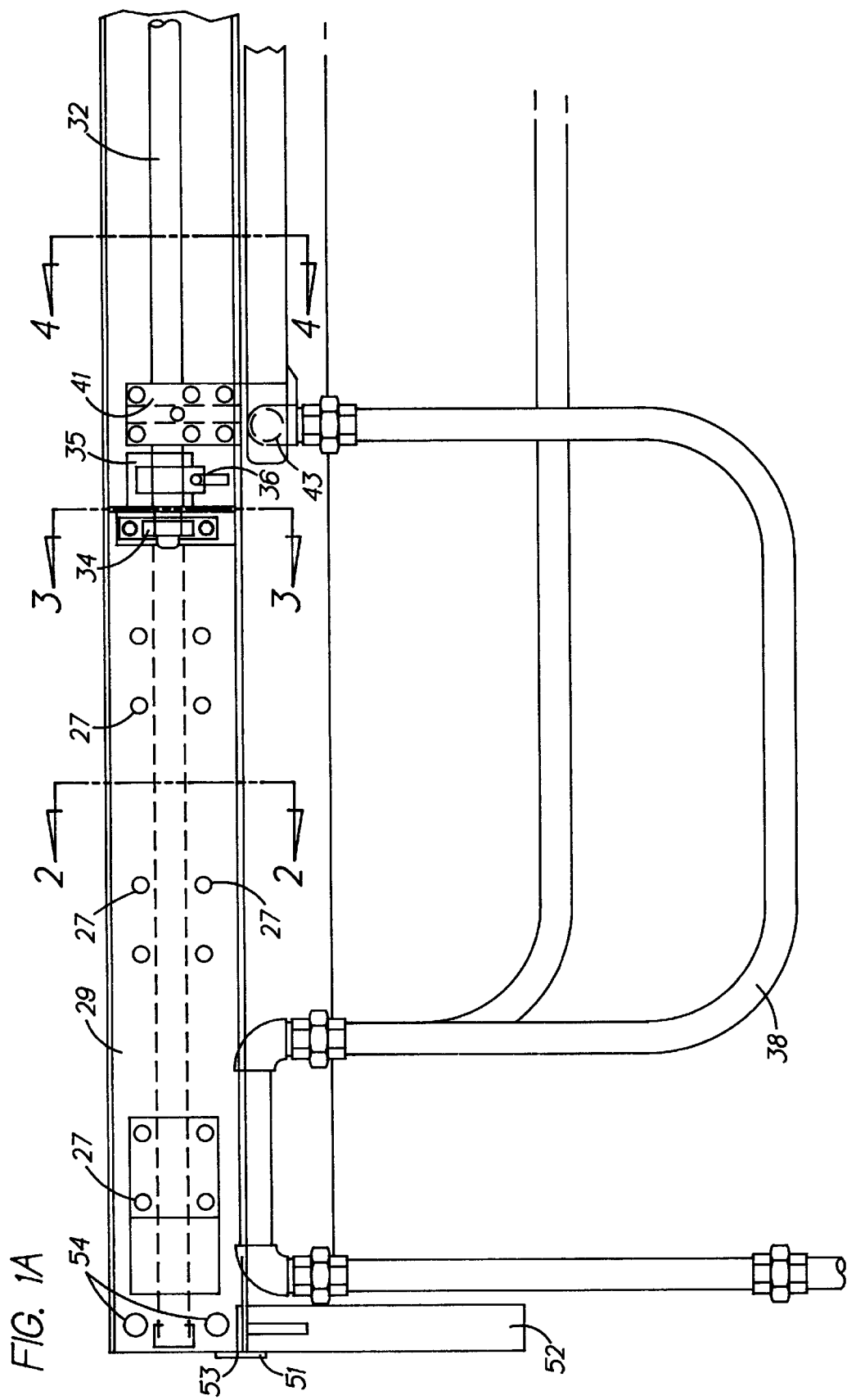
FIG. 1A and 1B are together an elongated view of the ascending side traversing shower of the invention.
Figure 1B:
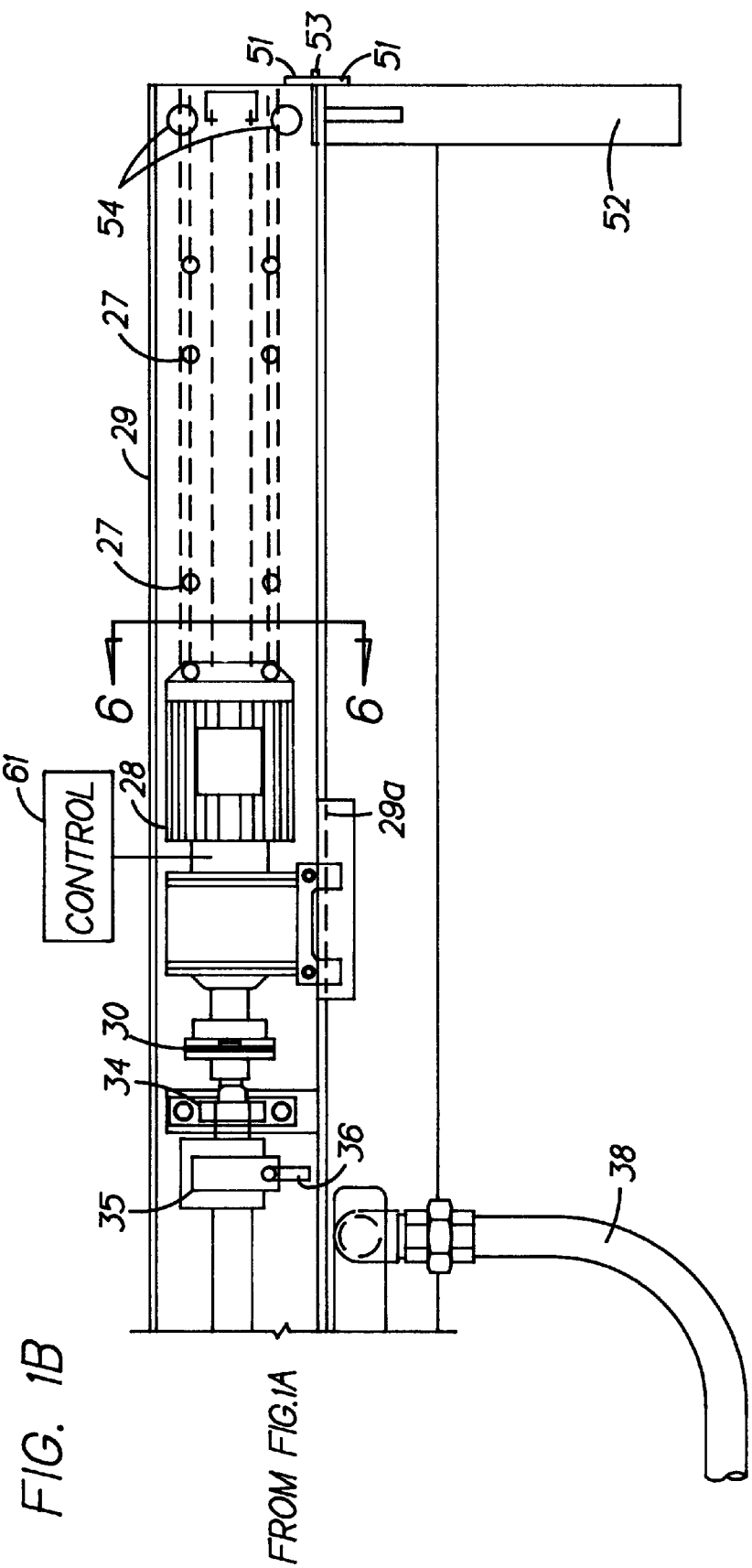
Figure 2:
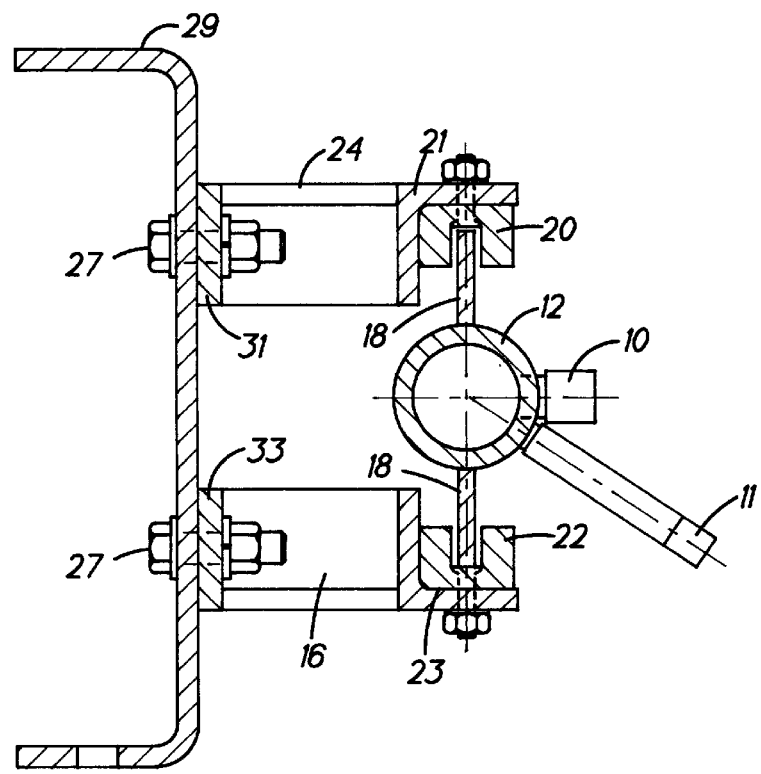
FIG. 2 is a section view taken along section line 2—2 in FIG. 1A.
Figure 3:
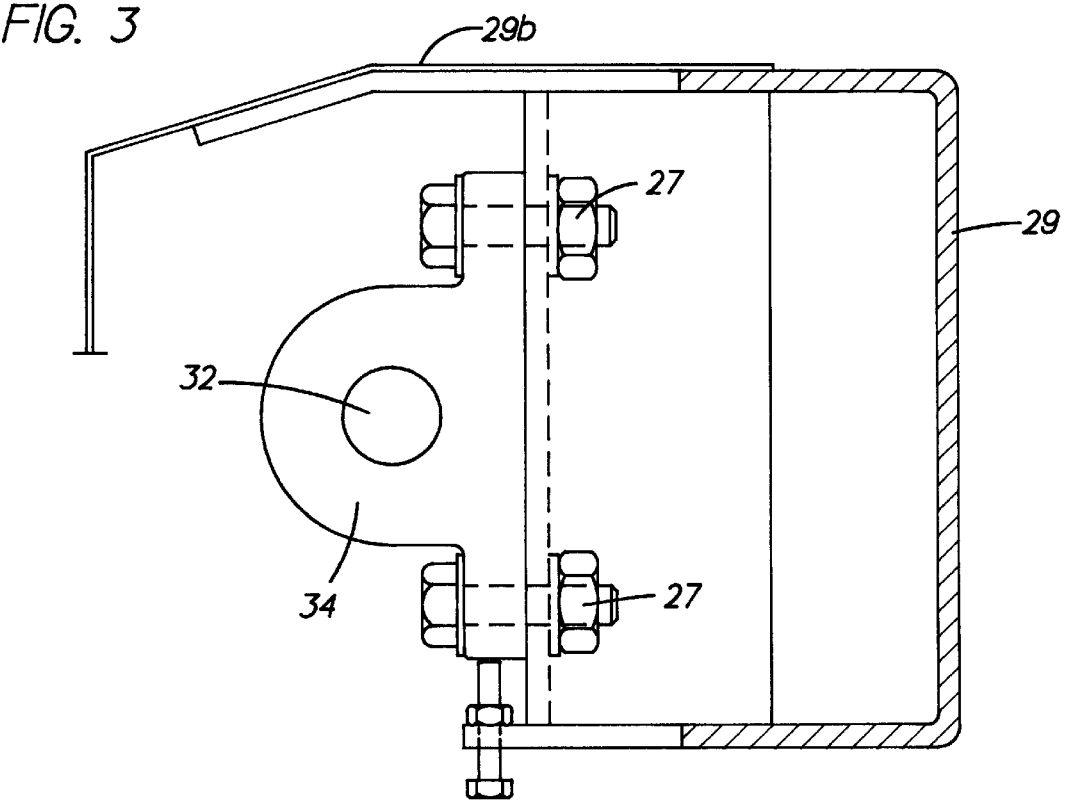
FIG. 3 is a section view taken along section line 3—3 in FIG. 1A.
Figure 4:
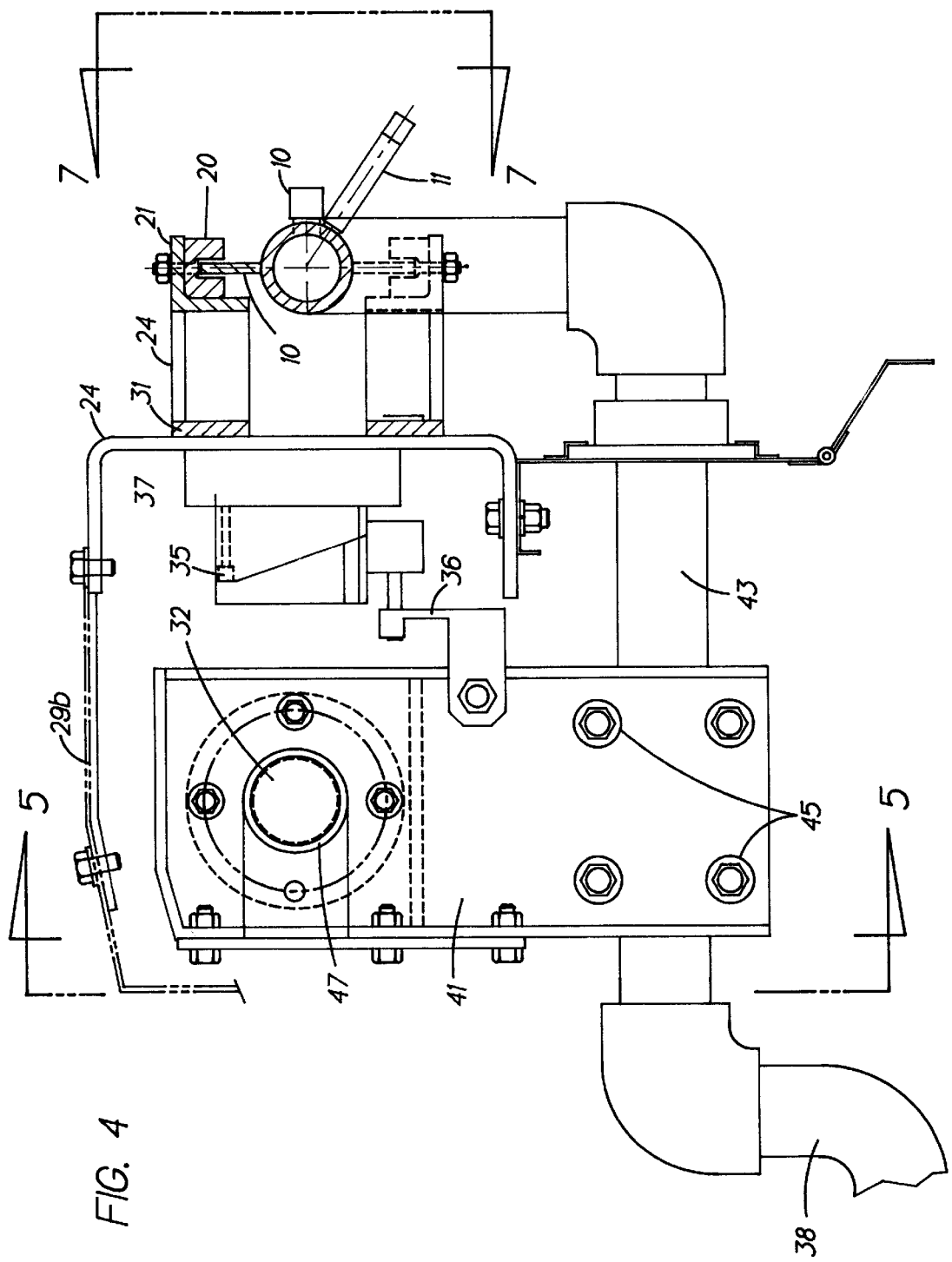
FIG. 4 is a section view taken along section line 4—4 in FIG. 1A.

Referring to FIGS. 1A–8, a first embodiment of the invention is illustrated. The first embodiment of the invention is directed to the ascending side of the rotary drum filter. In this embodiment, a plurality of nozzles 10 (and 11 where visible) are mounted on a fluid supply conduit or shower bar 12 at, preferably, about thirty-six to about forty-eight inches apart. Mounting a plurality of such nozzles at regular intervals allows for a smaller reciprocation of the washing device of the invention, thus an increase in the speed at which the entire drum 14 is cleaned without sacrificing quality of the operation or overworking components of the cleaning device. At each nozzle location, preferably, there are two nozzles, one immediately under the other as illustrated in FIGS. 2,4 and 8 and discussed more fully hereunder. Shower bar 12 includes flanges 16 and 18, flange 18 being circumferentially opposite flange 16. The flanges 16 and 18 ride in tracks 20 and 22, (preferably low friction plastic) respectively. Tracks 20 and 22 are positioned along shower bar 12 at advantageous areas to provide support. One of skill in the art will appreciate that the track must be positioned inboard on the shower bar 12 from the ends enough to prevent the bar from pulling out of the track. More specifically, the bar is shorter than the filter drum by a length approximately equivalent to its selected stroke (i.e. the bar is about 36 inches shorter than the overall length of the drum filter when the stroke of the traversing shower system is about 36 inches). The tracks are mounted preferably on angle iron brackets 21 and 23, respectively which are spaced from the main support channel by spacer brackets 24 and 26, again, respectively. The length of spacer brackets 24 and 26 is determined by the distance main support channel 29 is located from the filter drum 24 and the desired proximity of the nozzles 10 and 11 to drum 14. Spacer brackets 24 and 26 are preferably welded to angle iron brackets 21 and 23 and preferably are welded to flat stock 31 and 33 for bolting to main support channel 29 (see also FIGS. 1A and 1B) with bolts 27. It should be noted that the entire traversing shower assembly described herein is mounted on main support channel 29 which is affixed to the vat of drum filter 14 preferably by bolts to end supports which are welded onto the vat of filter 14.

Channel 29 is extended at 29a (see FIGS. 1B and 6) to provide support for motor drive 28, torque converter 30 and lead screw or jack shaft 32 and at 29b as a safety shield over the motor and lead screw. An additional support brace connected to the bottom of the extended channel at 29a and connected to the vat 13 at its other end may optionally be added to stiffen the bracketing of the invention if desired.

Lead screw 32 (FIGS. 1A and 1B) is, preferably, about thirty-six to about forty-eight inches in length and, preferably, is the same length as the spacing between nozzles 10. (The length is also equivalent to the shortened dimension of shower bar 12 relative to filter 14 and discussed above). On either side of lead screw or jack shaft 32 are support members 34 which act both to rotatably support the lead screw 32 and to support limit switches. Switches 36 are known to the art and are ubiquitously commercially available. The switches comprise a switch body 35 and a switch lever 36. To better place the limit switch body 35, a spacer 37 is provided in a preferred embodiment. Limit switches 35/36 are provided for their art recognized reasons of stopping progression of the carrier in one direction. The motor may then stop or rotate in the other direction as desired, the concept being known to the art.

Figure 5:
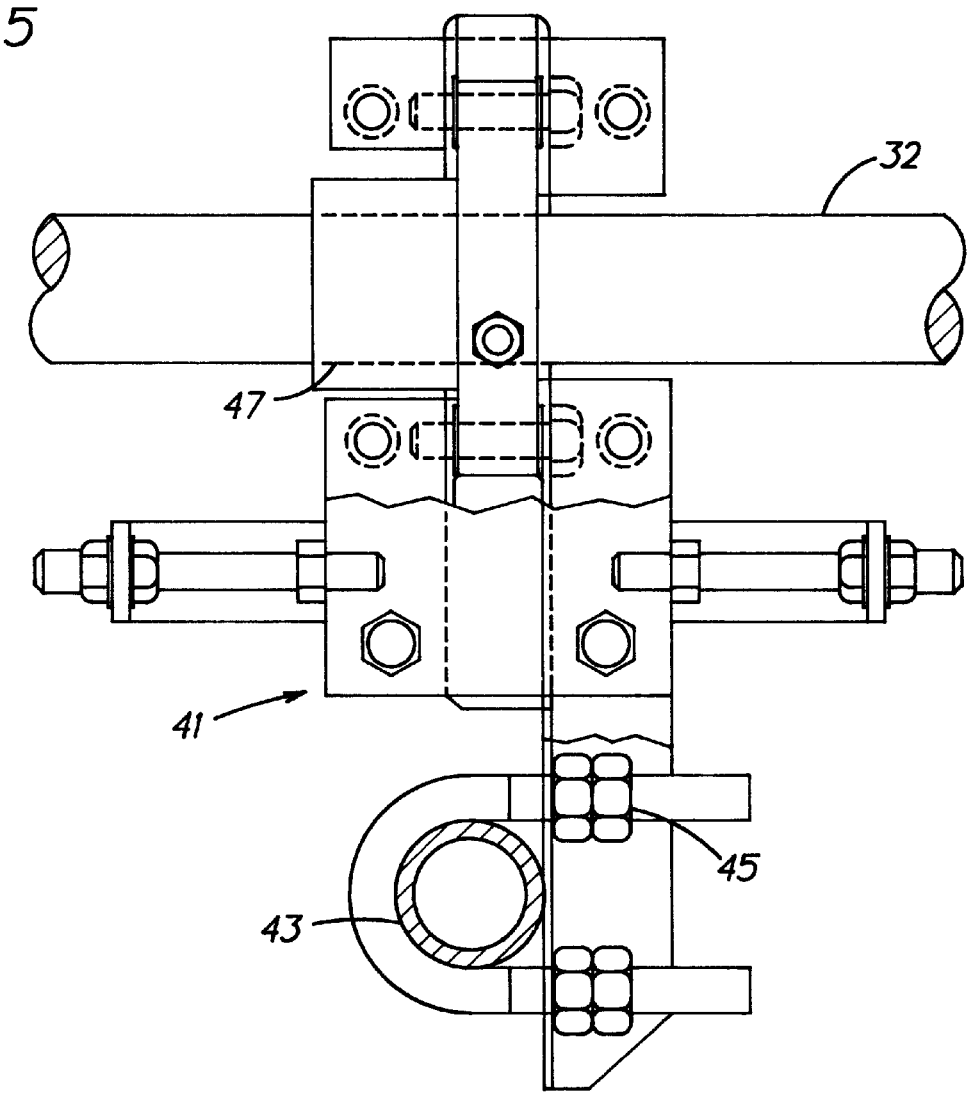
FIG. 5 is a section view taken along section line 5—5 in FIG. 4.
Figure 6:
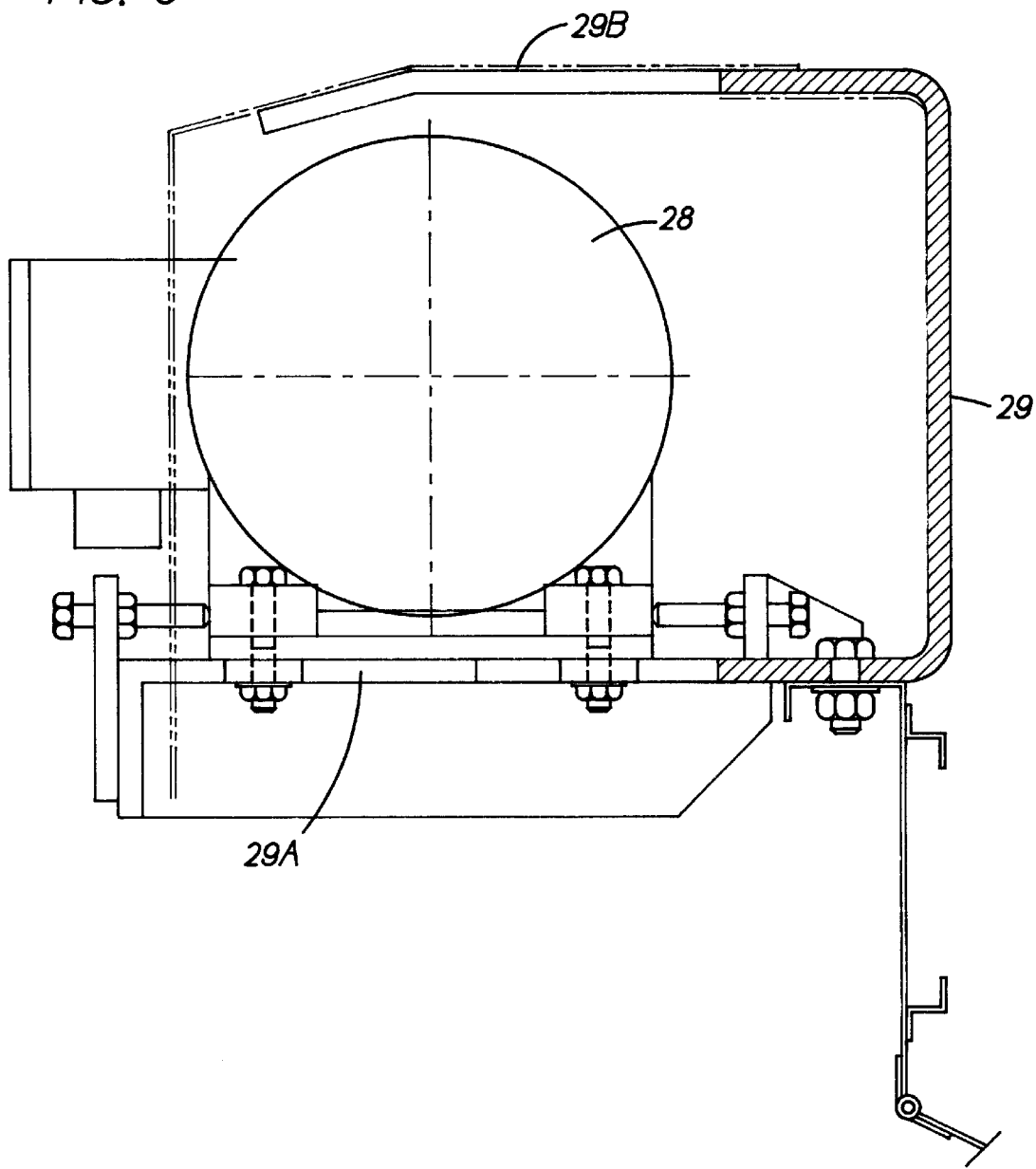
FIG. 6 is a section view taken along section line 6—6 in FIG. 1B.
Figure 7:
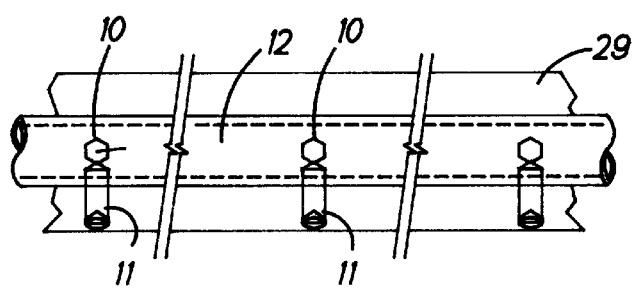
FIG. 7 is a section view taken along section line 7—7 in FIG. 4
Figure 10:
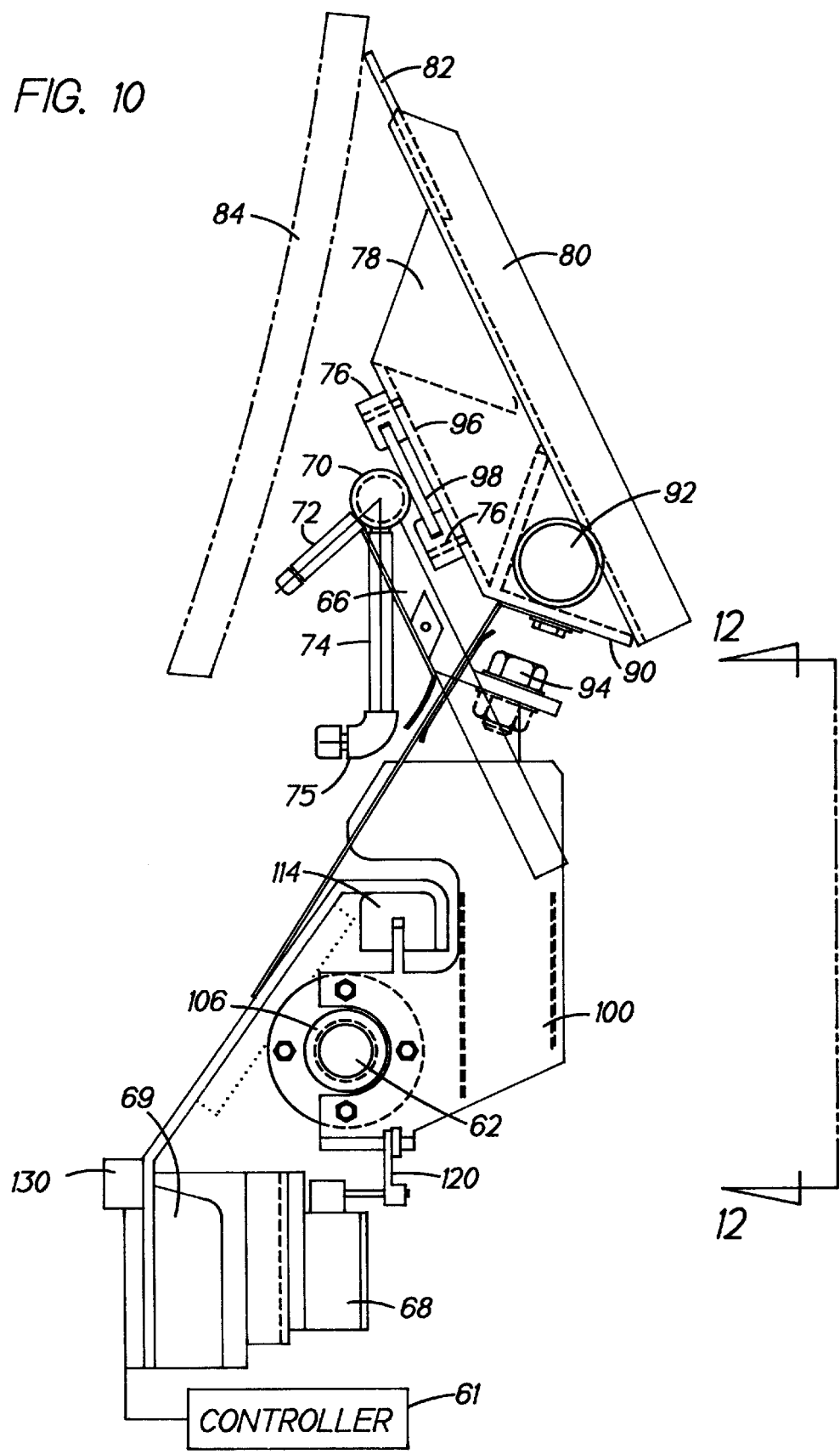
FIG. 10 is a section view taken along section line 10—10 in FIG. 9A.
Figure 11:
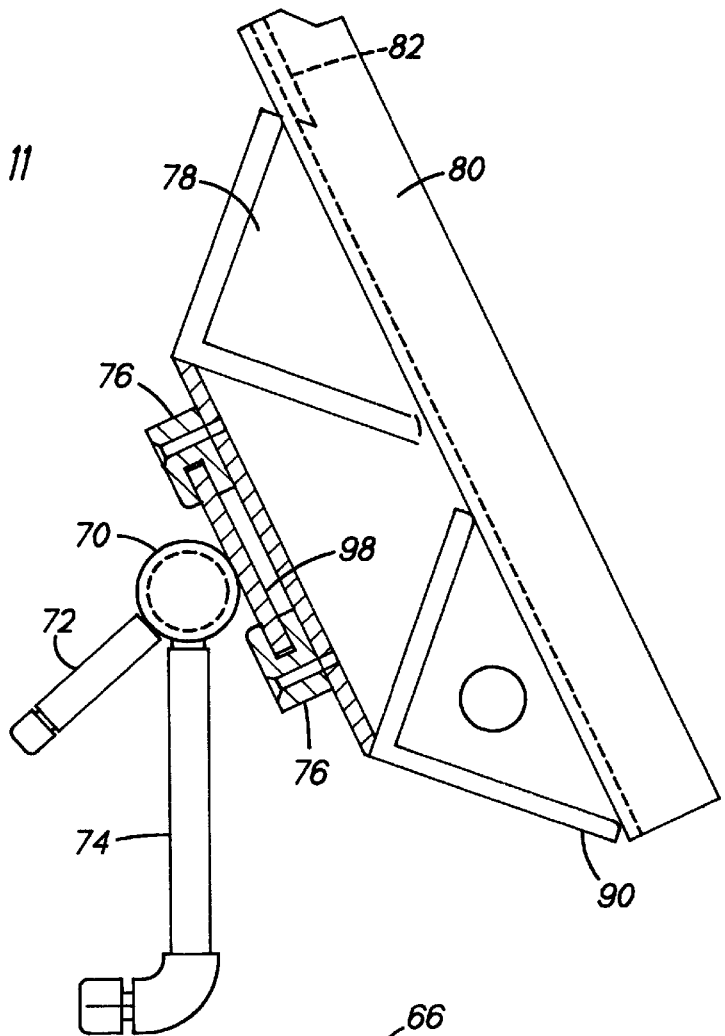
FIG. 11 is a section view taken along section line 11—11 in FIG. 9A.
Figure 12:
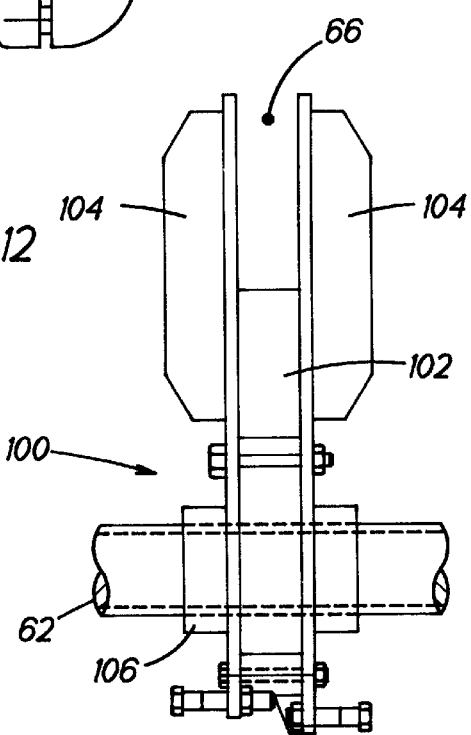
FIG. 12 is a section view taken along section line 12—12 in FIG. 10.

Shower bar 12 is moveable in reciprocating fashion as hereinbefore stated. Such movement is occasioned by the impetus of lead screw 32 and is translated to bar 12 through carrier 41. Carrier 41 is best illustrated in FIGS. 1A, 4 and 5 and includes a rigid section of tubing 43 attached to carrier 41 preferably with bolts 45 (could be welded) to provide a fixed connection for the bar 12 while keeping flexible hose 38 out of the way of lead screw 32. Carrier 41 is threadedly engaged to lead screw 32 by nut 47 which is fixedly connected to carrier 41. Hose 38 feeds shower bar 12 with wash fluid which is preferably water. High pressure hose 38 provides sufficient excess length to allow for movement of the carrier of at least about thirty-six to about forty-eight inches in the preferred embodiment. It should be understood that a much lesser or greater nozzle spacing is possible, if desired. In the case of a lesser nozzle spacing, the amount of excess tubing from high pressure hose 38 can be reduced, and in the case of a larger distance, increased. It should also be noted that the drive motor 28 of the present invention need only be a fractional horsepower motor as the carrier 41 and the bar 12 are extremely light and easy to move. The motor is variably actuated to adjust speed of the washing shower to complete cycles in a selected amount of time. Preferably variability is from about one hour to about five hours.

Referring to FIGS. 2 and 4, spray nozzles 10 and 11 are illustrated. Preferably, nozzles 10 and 11 have an angle between each stream emitted from said nozzles of approximately twenty to forty degrees measured from the horizontal. In a preferred embodiment the angle between nozzles is approximately thirty-eight degrees. One nozzle, the top nozzle 10 as depicted in the drawing, is horizontal and the second nozzle 11 is directed downward therefrom the indicated number of degrees. The selected angle between nozzles 10 and 11 is effective in primarily breaking the precoat and secondarily washing the filter material of drum filter 14 clean. The preferred angle of thirty-eight degrees provides for better removal of the filter cake and cleaning of the filter media. As can be easily understood from FIGS. 1–4, this embodiment of the invention is positioned on the ascending side of the drum and, therefore, is suspended entirely separately from the doctor blade which is located on the descending side of the drum. An advantage to this location is easy access to the system for service and maintenance. Service and maintenance are facilitated referring to FIG. 8, by providing pivot bracket 51 attached to assembly mounting bracket 52 which is mounted to the vat 13 of the rotary drum filter. Brackets 52 may be attached in any number of ways and preferably are welded to vat 13. Pivot bracket 51 supports pivot pin 53 upon which is mounted to main channel 29. Thus, upon removing bolts 54 (see FIGS. 1A and 1B) from the main channel 29 at each end of channel 29, the entire traversing shower assembly may be tilted outwardly away from the drum 14. In a preferred embodiment the assembly tilts away by about 30° to facilitate service and maintenance of nozzles 10 and 11 or shower bar 12. The tilt feature preferably adds a tilt restricting plate 55 to prevent over tilting. This is quite advantageous because it avoids the longer down time of the machine to clean the nozzles if disassembly were required.

Referring now to FIGS. 9A–12, a second traversing shower embodiment of the invention is disclosed and discussed. In this embodiment of the invention, the traversing shower system is located on the descending side of the drum and below the conventional doctor blade 82. This is most easily understood by a review of FIG. 10. One advantage of this arrangement is that the device may be attached to existing bracketry for holding up the doctor blade, or to the blade itself; the second benefit of the arrangement is that the drum is washed immediately after lime cake to be reburned has been scraped from the top layer of the filtering drum. Thus, less filter cake material is left to be removed from the filter material of the drum by the washing nozzles. Referring to FIGS. 9A–12, one familiar with the art will recognize a doctor blade 82 and blade support 80 which are mounted conventionally on blade bracket 78 which is conventionally supported by apparatus not shown (all conventional, commercially available prior art parts). At the lower end of blade support 80, one of skill in the art will recognize angle support 90 and pivot shaft 92 as well as blade adjustment assembly 94 and tie in plate 96 extending from angle support 90 to blade bracket 78 (again all parts are conventional and commercially available).

In one aspect of the second embodiment of the invention these parts are employed to provide support for the traversing shower assembly. More specifically (see FIG. 10), tie in plate 96 is used to hold guides 76, preferably of a polymeric low-friction material. The guides 76 in turn slidably secure shower bar plate 98 in the desired position. Shower bar 70 is preferably welded thereto at a tangent sufficient to position nozzles 72 and 74 in the selected position relative to the drum 84. Preferably nozzle 72 is positioned at about 45° from horizontal with nozzle 74 being positioned about 20° to about 40° therefrom in the downward direction. This promotes peeling of the filter cake from the filter material which then makes the nozzle 74 more effective in cleaning the filter material. In a preferred embodiment nozzle 74 may include an angled end section 75 to angle the spray emitting therefrom in a horizontal direction. In a preferred embodiment the nozzles are about 38° apart.

It should be noted that regarding shower bar 70, the placement and regularity of nozzles may be the same as those discussed in the first embodiment. Moreover the length of the bar 70 will be determined as above discussed and the stroke will be similar to the nozzle spacing.

Shower bar 70 is driven by drive member 66 which is preferably attached to shower bar 70 by welding. Member 66 extends to be received in drive yoke 100 (see FIGS. 10 and 12). Drive yoke 100 is preferably constructed of tin plates spaced and welded together to form a slot 102 to receive member 66 therewithin. Member 66 preferably is received in slot 102 without any fasteners or affixing devices or means so as to be easily moveable therein and removable therefrom, if necessary. In a preferred embodiment, member 66 includes gussets 104 on either side thereof to provide lateral rigidity. The gussets are not required but are preferred since the lateral rigidity of member 66 is what translates the movement imparted to yoke 100 through screw follower 106 from lead screw 62 to shower bar 70. Upon rotary movement of lead screw 62, then, shower bar 70 will move in one direction or the other.

Driving lead screw 62 is motor 58 through coupler 60 (see FIG. 9A). The lead screw is held in place by screw brackets 108 and caps 110 which provide a hole therethrough to rotatably support lead screw 62 and which are bolted, welded or otherwise affixed to vat wall 112. Motor 58 is also affixed to vat 112 via a bracket 59 (see FIG. 9A).

Again referring to FIG. 9A, and as in the previous embodiment, limit switches are provided to help prevent yoke 100 from traveling too far on screw 62. In this embodiment limit switches 68 are mounted on spacer 69 which is in turn mounted to vat 112. Arm 120 of limit switch 68 is disposed so as to be deflected by yoke 100 as the yoke comes into contact therewith.

Maintenance and service of this embodiment of the invention requires no special arrangement since the conventional servicing capability of the doctor blade also moves the shower assembly into a tilted position where access to the nozzles is unimpeded. Pivotability of the invention is provided by the lack of fixing of member 66 in yoke 100. More particularly member 66 is moveable in yoke 100 which allows the entire upper assembly to move with the doctor blade 82 and support 80.

The system of the invention which employs at least one of the above described arrangements is initiated preferably by a controller 61 only when cleaning is necessary and, therefore, reduces total filter wear. In preferred embodiments either vat liquid level sensors and/or pressure sensors are employed. Selected conditions recognized by the sensors indicates a clogged filter cake. The reading of that signal by a controller indicates a need for a wash sequence. A wash sequence may be had in a number of forms including a specific cycle after which the traversing shower assembly will stop; a cycle which begins upon demand of the sensor(s) at a value or a range and continues until the sensor either stops signaling (simple sensors) or signals that the parameter being measured has returned to an acceptable value or range or a cycle which begins upon a signal from a, or a group of, sensor(s) at values or ranges. In any event, the system is based upon demand and is therefore a discontinuous operation. A discontinuous system extends the life of the filter material of the drum filter. Washing cycles are hard on the filter material so the avoidance of unnecessary washes is particularly beneficial. The traversing shower assembly of the invention upon demand to begin will reciprocate back and forth pursuant to limit switches as discussed above until a stop is indicated preferably by the controller or by a selected cleaning program which may be based upon time or a number of oscillations, etc.

In particular embodiments of the invention, the vat liquid level sensors are of the differential pressure type. Differential pressure sensors are known to many industries and are readily commercially available The sensors most preferably include a membrane having an arm located centrally therein. When pressure deflects the membrane the arm affects a potentiometer allowing a technician or a controller to read the internal vat level. Pressure on the sensor 130 changes due to the level of liquid in the vat above the level of the sensor on the wall 112 of the vat. A preferable location of the sensor 130 in the invention is at the end or head of the vat under the liquid level to measure the head of liquid over the sensor.

In the case of the vacuum line pressure sensors in this invention, the same is/are preferably located within the filtrate line (not shown). One of skill in the art will appreciate the advantages of placing the sensor in the exiting filtrate line since that line is larger in diameter than other vacuum lines in a conventional drum filter and additionally it does not rotate and therefore does not require a rotating contact for providing power thereto or receiving information therefrom. Either of the sensor systems of the invention are workable independently or in concert and both are independently capable of initiating the shower mechanism. As one of skill in the art will readily appreciate, it is also possible to use both vat liquid level sensors and vacuum line pressure sensors in tandem to provide a redundant system.

When either high liquid level or increased vacuum signals or any other rotary vacuum drum filter parameter indicative of the need to begin a wash cycle is supplied to the controller, the system of the invention is activated. It should be noted that the controller may be located at the machine or distant therefrom and may be a technician or from a simple electrical circuit to a computer processor. The important point is that the traversing shower of the invention runs when it needs to and parks when it does not need to run, need being determined by sensing at least one parameter of the vacuum drum filter that is being monitored.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A control system for a traversing shower for cleaning separated particulate material carried on a vacuum drum filter comprising:

a) at least one sensor sensing at least one parameter of said vacuum drum filter; and b) a controller in communication with said sensor, said controller automatically controlling said traversing shower in response to said sensed parameter.

2. A control system for a traversing shower for a vacuum drum filter as claimed in claim 1 wherein said at least one parameter is a pressure value related to the extent of particulate material carried on the drum.

3. A control system for a traversing shower for a vacuum drum filter as claimed in claim 2 wherein said at least pressure value is a pressure range.

4. A control system for a traversing shower for a vacuum drum filter as claimed in claim 1 wherein said at least one parameter is the level of a pool of slurry of particulate material through which the vacuum drum is rotated.

5. A control system for a traversing shower in a vacuum drum filter as claimed in claim 4 wherein said at least pool level is a range of levels for said vacuum drum filter.

6. A control system for a traversing shower in a vacuum drum filter as claimed in claim 1 wherein said at least one sensor is one of a plurality of sensors each sensing at least one parameter of said vacuum drum filter.

7. A control system for a traversing shower in a vacuum drum filter as claimed in claim 6 wherein said controller controls said shower in response to the sensing of the plurality of parameters of said vacuum drum filter.

8. A traversing shower system for a rotary drum filter comprising:
   a) a nozzle carrier having a plurality of nozzles thereon in spaced intervals;
   b) a drive system operatively attached to said carrier, said drive system imparting reciprocating movement to said carrier;
   c) at least one sensor sensing at least one parameter of said vacuum drum filter; and
   c) a controller in communication with said sensor, said controller automatically controlling said traversing shower in response to said sensed parameter.

9. A control system for a traversing shower in a vacuum drum filter as claimed in claim 8 wherein at each spaced interval, two nozzles are located which are vertically aligned with one another.

10. A logic controlled traversing shower for a vacuum drum filter as claimed in claim 8 wherein said drive system includes a motor, torque converter and lead screw.

11. A logic controlled traversing shower for a vacuum drum filter as claimed in claim 10 wherein said drive system further includes limit switches at the extent of travel of the lead screw.

12. A logic controlled traversing shower for a vacuum drum filter as claimed in claim 8 wherein said shower is located on an ascending side of said drum.

13. A logic controlled traversing shower for a vacuum drum filter as claimed in claim 8 wherein said shower is located on a descending side of said drum.

14. A control system for a traversing shower for a vacuum drum filter as claimed in claim 8 wherein said shower assembly is further adapted to tilt away from said vacuum drum to facilitate cleaning of said nozzles.

15. A method for automatically controlling a traversing shower for a a vacuum drum filter comprising:
   a) sensing at least one parameter of said filter; and
   b) automatically controlling said traversing shower in response to said sensed parameter.

16. A method for automatically controlling a traversing shower for a vacuum drum filter as claimed in claim 15 wherein said at least one parameter is a plurality of parameters, said controlling being responsive to said sensing of said plurality of parameters.

17. A method for automatically controlling a traversing shower for a vacuum drum filter as claimed in claim 15 wherein said automatically controlling said traversing shower includes activating said traversing shower.

18. A method for automatically controlling a traversing shower for a vacuum drum filter as claimed in claim 15 wherein said automatically controlling said traversing shower includes activating said traversing shower and deactivating said traversing shower.

19. A rotary drum filter having a vacuum drum positioned within a slurry of particulate matter to be separated comprising;
   a) a traversing shower system;
   b) at least one sensor sensing at least one parameter of said vacuum drum filter; and
   c) a controller in communication with said sensor, said controller automatically controlling said traversing shower in response to said sensed parameter.

20. A rotary drum filter having a vacuum drum positioned within a slurry of particulate matter to be separated as claimed in claim 19 wherein said traversing shower system comprises:
   a) a nozzle carrier having a plurality of nozzles thereon in spaced intervals;
   b) a drive system operatively attached to said carrier, said drive system imparting reciprocating movement to said carrier.

* * * * *